(12) United States Patent
Sakurai et al.

(10) Patent No.: US 12,528,673 B2
(45) Date of Patent: Jan. 20, 2026

(54) PARKING BRAKE DEVICE AND WORK MACHINE EQUIPPED WITH THE SAME

(71) Applicant: KOBELCO CONSTRUCTION MACHINERY CO., LTD., Hiroshima (JP)

(72) Inventors: Hitoshi Sakurai, Hyogo (JP); Shintaro Sasai, Hyogo (JP); Kenichi Terauchi, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 279 days.

(21) Appl. No.: 18/253,135

(22) PCT Filed: Jan. 19, 2022

(86) PCT No.: PCT/JP2022/001780
§ 371 (c)(1),
(2) Date: May 16, 2023

(87) PCT Pub. No.: WO2022/158488
PCT Pub. Date: Jul. 28, 2022

(65) Prior Publication Data
US 2023/0416057 A1     Dec. 28, 2023

(30) Foreign Application Priority Data
Jan. 20, 2021   (JP) .................................. 2021-007204

(51) Int. Cl.
*B66C 13/30*    (2006.01)
*B66C 13/16*    (2006.01)
(Continued)

(52) U.S. Cl.
CPC .............. *B66C 13/30* (2013.01); *B66C 13/16* (2013.01); *B66C 23/94* (2013.01); *B66C 23/86* (2013.01);
(Continued)

(58) Field of Classification Search
CPC ......... B66C 13/30; B66C 13/16; B66C 23/86; B66C 2700/0342; E02F 9/125; E02F 9/2225; E02F 9/2285
See application file for complete search history.

(56) References Cited

U.S. PATENT DOCUMENTS

| | | | |
|---|---|---|---|
| 10,946,790 B1 * | 3/2021 | Patterson | B60Q 1/1461 |
| 2014/0145657 A1 * | 5/2014 | Takeo | E02F 9/123 318/400.21 |

FOREIGN PATENT DOCUMENTS

| | | |
|---|---|---|
| EP | 0 481 501 A1 | 4/1992 |
| JP | 63-312432 A | 12/1988 |

(Continued)

OTHER PUBLICATIONS

Extended European Search Report issued Mar. 21, 2024 in European Patent Application No. 22742610.3, 8 pages.
(Continued)

*Primary Examiner* — Hitesh Patel
*Assistant Examiner* — Reece Anthony Wakely
(74) *Attorney, Agent, or Firm* — Oblon, McClelland, Maier & Neustadt, L.L.P.

(57) ABSTRACT

Provided is a parking brake apparatus installable on a work machine. The parking brake apparatus includes: a parking brake switchable between a braking state of braking the turning of an upper turning body and a braking release state; a brake operation device to which a braking operation and a braking release operation for switching the parking brake to the braking state and the braking release state, respectively, (Continued)

is applied by an operator; and a braking control unit. The braking control unit judges whether or not a turning judgment requirement for judging whether or not the upper turning body is performing a turning motion is satisfied, and performs a braking operation invalidation control to invalidate the braking operation applied to the brake operation device when judging the turning motion is being performed.

5 Claims, 4 Drawing Sheets

(51) Int. Cl.
*B66C 23/94* (2006.01)
*B66C 23/86* (2006.01)
*E02F 9/12* (2006.01)
*E02F 9/22* (2006.01)

(52) U.S. Cl.
CPC ....... *B66C 2700/0342* (2013.01); *E02F 9/125* (2013.01); *E02F 9/2225* (2013.01); *E02F 9/2285* (2013.01)

(56) References Cited

FOREIGN PATENT DOCUMENTS

| JP | 2017-24825 A | | 2/2017 |
|---|---|---|---|
| JP | 2017105584 A | * | 6/2017 |

OTHER PUBLICATIONS

International Search Report issued Mar. 29, 2022 in PCT/JP2022/001780 filed on Jan. 19, 2022, 2 pages.

* cited by examiner ns performed by a controller included in the parking brake
PARKING BRAKE DEVICE AND WORK MACHINE EQUIPPED WITH THE SAME

TECHNICAL FIELD

The present invention relates to a parking brake apparatus for a work machine and a work machine including the same.

BACKGROUND ART

There is a conventionally known work machine including a parking brake apparatus. For example, Patent Document 1 discloses a crane, which includes a parking brake. The parking brake applies a braking force to a turning motor to prevent an upper turning body from turning with respect to a lower traveling body to keep a stopping state.

The parking brake is actuatable even during the turning of the upper turning body, which may cause a sudden stop of the upper turning body that had been turning to thereby cause a large swing of a load suspended by an attachment or damage in the attachment.

CITATION LIST

Patent Literature

Patent Literature 1: Japanese Unexamined Patent Publication No. 2017-24825

SUMMARY OF INVENTION

It is an object of the present invention to provide a parking brake apparatus including a parking brake for braking an upper turning body of a work machine, the parking brake apparatus being capable of preventing the parking brake from improper operation, and a work machine including the parking brake apparatus.

Provided is a parking brake apparatus installable on a work machine that includes a lower travel body, an upper turning body mounted on an upper part of the lower travel body capably of turning, and an attachment mounted on the upper turning body. The parking brake apparatus includes a parking brake, a brake operation device, and a braking controller. The parking brake is switchable between a braking state of braking turning of the upper turning body with respect to the lower traveling body and a braking release state of releasing braking of the turning. The brake operation device allows a braking operation and a braking release operation to be applied to the brake operation device. The braking operation is an operation for bringing the parking brake into the braking state, and the braking release operation is an operation for bringing the parking brake into the braking release state. The braking controller is configured to judge whether or not a preset turning judgment requirement for judgment that the upper turning body is performing a turning motion with respect to the lower traveling body is satisfied and configured to execute a braking operation invalidation control only when judging that the turning judgment requirement is satisfied. The braking operation invalidation control is a control to invalidate the braking operation applied to the brake operation device, that is, a control to prohibit the parking brake from being brought into the braking state by the braking operation applied to the brake operation device.

DESCRIPTION OF EMBODIMENTS

There will be described a preferred embodiment of the present invention with reference to the drawings.

Figure 1:
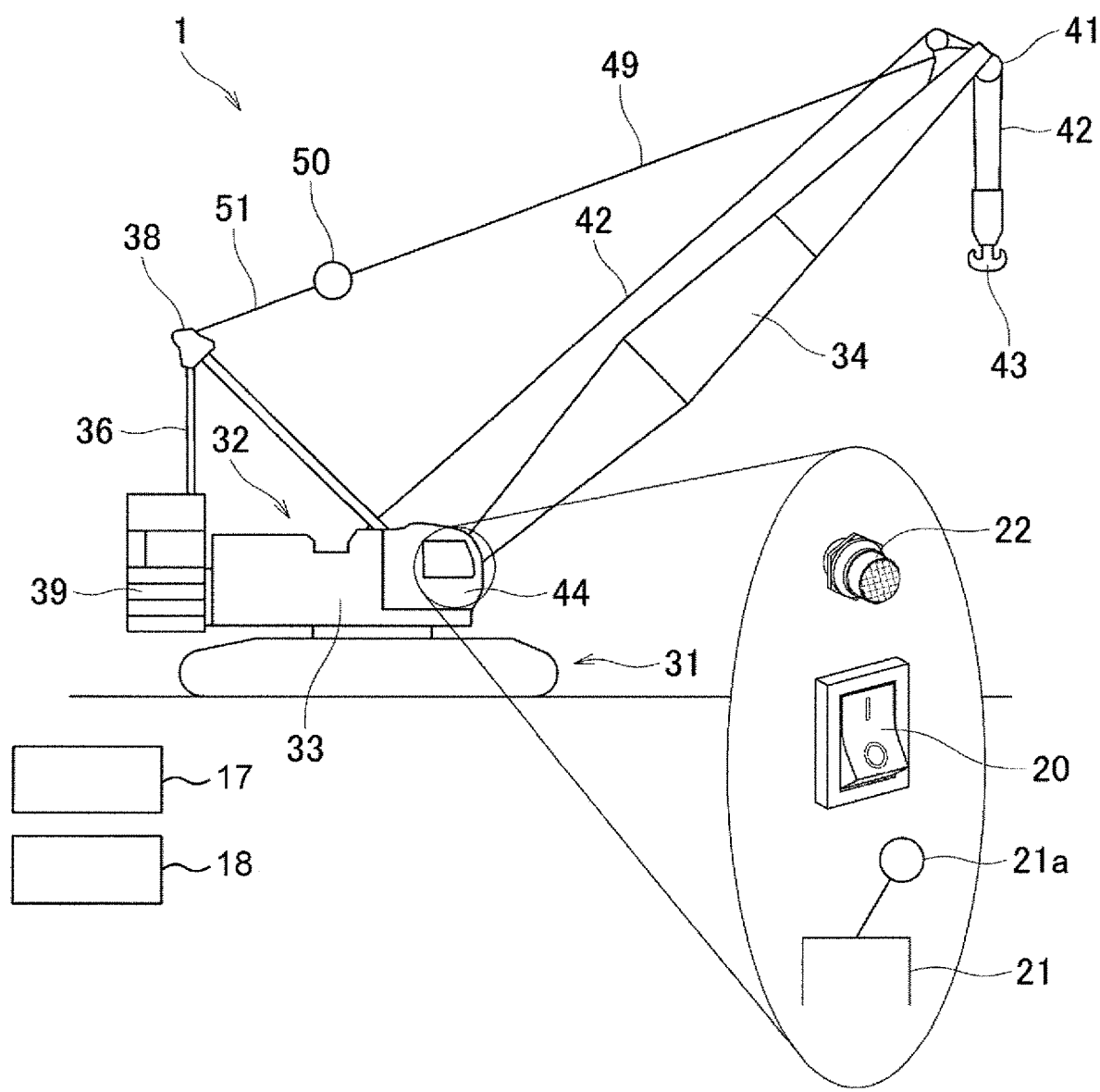
FIG. 1 is a side view of a crane according to an embodiment of the present invention.

FIG. 1 shows a crane 1, which is a work machine according to the present embodiment. The crane 1 includes a crawler type lower traveling body 31, an upper turning body 32 mounted on the lower traveling body 31 capably of turning, and an attachment mounted on the upper turning body 32. The attachment includes a boom 34.

The work machine according to the present invention may be a mobile crane provided with a moving means other than crawlers, such as wheels, or a stationary crane with no moving means. Moreover, the work machine according to the present invention is not limited to a crane but also permitted to be a hydraulic excavator or the like.

The upper turning body 32 includes a turning frame 33, a winding device, a boom derricking device, a counterweight 39, and a cab 44.

The turning frame 33 is mounted on the lower traveling body 31 through an unillustrated turning bearing. The boom 34 is connected to the front part of the turning frame 33 capably of derricking with respect to the turning frame 33.

The winding device performs hoisting and lowering a suspended load that is suspended from the distal end of the boom 34. The winding device includes a point sheave 41, a hoisting rope 42, a hook 43, and an unillustrated winding winch. The point sheave 41 is rotatably attached to the distal of the boom 34. The hook 43 is suspended from the point sheave 41 through the hoisting rope 42. The winding winch is disposed in the center part of the turning frame 33, and performs winding and unwinding of the hoisting rope 42 to thereby hoist and lower the hook 43. The attachment may further include a jib. The jib is mounted on the distal end of the boom 34 capably of derricking and allows the hook 43 to be suspended from the distal end of the jib.

The boom derricking device makes the boom 34 derrick. The boom derricking device includes a gantry 36, a lower spreader 38, an upper spreader 50, a boom guy line 49, a boom derricking rope 51, and an unillustrated boom derricking winch. The gantry 36 is mounted on the rear part of the turning frame 33. The lower spreader 38 is mounted on the upper end of the gantry 36. The boom guy line 49 has one end connected to the tip of the boom 34 and the other end that is connected to the upper spreader 50. The boom derricking rope 51 is stretched over the lower spreader 38 and the upper spreader 50. The boom derricking winch is disposed on the center part of the turning frame 33. The boom derricking winch winds or unwinds the boom derricking rope 51, thereby making the boom 34 derrick, that is, moving the boom 34 vertically and rotationally about a boom foot pin which is the fulcrum of the boom 34. The boom derricking device may include a mast instead of the gantry 36.

The counterweight 39 is mounted on the rear part of the turning frame 33. The cab 44 is an operation room, mounted on the front part of the turning frame 33.

Figure 2:
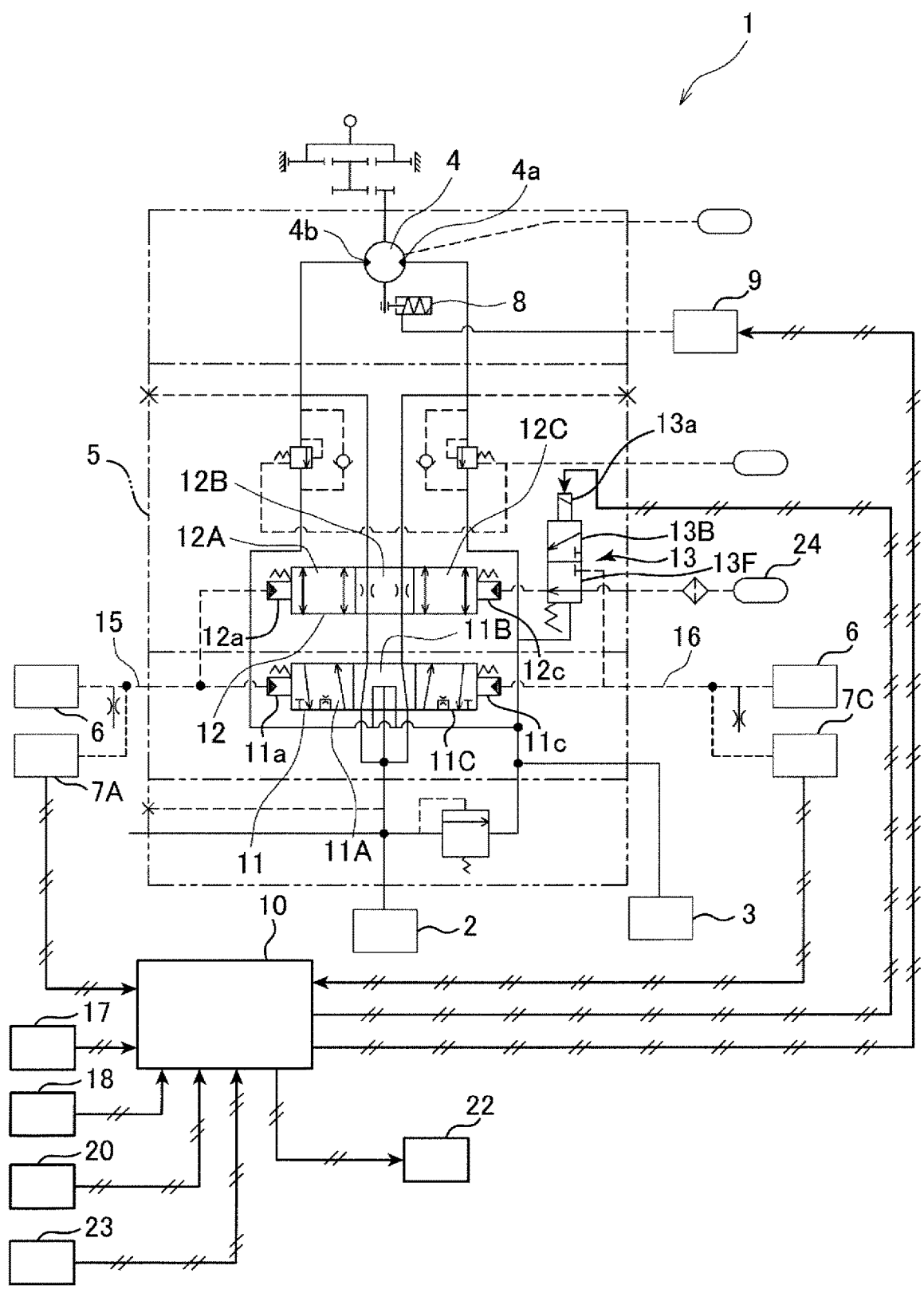
FIG. 2 shows a hydraulic circuit installed on the crane.

FIG. 2 shows a hydraulic circuit installed on the crane 1. As shown in FIG. 2, the crane 1 includes a hydraulic pump 2, a tank 3, a turning motor 4, a control valve 5, a remote-control valve 6, a right-turning pilot pressure sensor 7A, a left-turning pilot pressure sensor 7C, a parking brake 8, a braking operation valve 9, a controller 10 with a braking control unit, a turning speed detector 17, a load detector 18, a turning operation device 21, a brake operation device 20, and a neutral-mode selection switch 23. The parking brake 8, the braking operation valve 9, the turning speed detector 17, the load detector 18, the brake operation device 20, and the braking control unit constitute a parking brake apparatus.

The hydraulic pump 2 is a hydraulic source for moving a plurality of hydraulic actuators including the turning motor 4. The tank 3 stores hydraulic fluid for the hydraulic circuit. The turning motor 4 is driven by hydraulic fluid supplied from the hydraulic pump 2, thereby operated to turn the upper turning body 32 with respect to the lower traveling body 31.

The turning motor 4 has a right-turning port 4a and a left-turning port 4b. The turning motor 4 is operated to bring the upper turning body 32 into right-turning motion with respect to the lower traveling body 31, by the supply of hydraulic fluid to the right-turning port 4a. On the other hand, the turning motor 4 is operated to bring the upper turning body 32 into left-turning motion with respect to the lower traveling body 31, by the supply of hydraulic fluid to the left-turning port 4b.

The control valve 5 is disposed between the hydraulic pump 2 and the turning motor 4 to render the supply of hydraulic fluid from the hydraulic pump 2 to the turning motor 4 controllable. The control valve 5 includes a directional control valve section 11, a brake valve section 12, and a neutral-mode selector valve section 13. The directional control valve section 11 and the brake valve section 12 are serially arranged. The directional control valve section 11 and the brake valve section 12 allow respective pilot pressures to be input to them from the remote-control valve 6.

The directional control valve section 11 is a pilot-operated hydraulic selector valve having a right-turning pilot port 11a and a left-turning pilot port 11c. The right-turning pilot port 11a is connected to the remote-control valve 6 through a right-turning pilot line 15, while the left-turning pilot port 11c is connected to the remote-control valve 6 through a left-turning pilot line 16. The directional control valve section 11 is kept at a neutral position 11B with no pilot pressure input to any of the right-turning pilot port 11a and the left-turning pilot port 11c. On the other hand, the directional control valve section 11 is shifted from the neutral position 11B to a right-turning position 11A by the input of a pilot pressure to the right-turning pilot port 11a through the right-turning pilot line 15, and shifted from the neutral position 11B to a left-turning position 11C by the input of a pilot pressure to the left-turning pilot port 11c through the left-turning pilot line 16.

The directional control valve section 11 forms a right-turning flow path at the right-turning position 11A, the right-turning flow path allowing the hydraulic fluid discharged from the hydraulic pump 2 to be supplied to the right-turning port 4a of the turning motor 4. The directional control valve section 11 forms a left-turning flow path at the left-turning position 11C, the left-turning flow path allowing the hydraulic fluid discharged from the hydraulic pump 2 to be supplied to the left-turning port 4b of the turning motor 4.

The directional control valve section 11 forms a circulation circuit at the neutral position 11B, the circulation circuit allowing hydraulic fluid to be circulated over the directional control valve section 11 and the turning motor 4. Specifically, the circulation flow path allows the hydraulic fluid discharged from the turning motor 4 to return to the turning motor 4 through the directional control valve section 11, thereby allowing the upper turning body 32 to continue the turning motion by its own inertia.

The brake valve section 12 is a pilot-operated hydraulic selector valve having a right pilot port 12a and a left pilot port 12c. The right pilot port 12a is connected to the remote-control valve 6 through the right-turning pilot line 15, and the left pilot port 12c is connected to the remote-control valve 6 through the left-turning pilot line 16. The brake valve section 12 is kept at a neutral position 12B with no pilot pressure input to any of the right pilot port 12a and the left pilot port 12c. On the other hand, the brake valve section 12 is shifted from the neutral position 12B to a right position 12A by the input of a pilot pressure to the right pilot port 12a through the right-turning pilot line 15, and shifted from the neutral position 12B to the left position 12C by the input of a pilot pressure to the left pilot port 12c through the left-turning pilot line 16.

The brake valve section 12 has a right pilot port 12a and a left pilot port 12c. The right pilot port 12a is connected to the remote-control valve 6 through the right-turning pilot line 15 as well as the right-turning pilot port 11a. The left pilot port 12c can be connected to the remote-control valve 6 through the left-turning pilot line 16 as well as the left-turning pilot port 11c. The brake valve section 12 is kept at a neutral position 12B with no pilot pressure input to any of the right pilot port 12a and the left pilot port 12c. On the other hand, the brake valve section 12 is shifted from the neutral position 12B to a right position 12A by the input of a pilot pressure to the right pilot port 12a, and shifted from the neutral position 12B to a left position 12C by the input of a pilot pressure to the left pilot port 12c.

At each of the right position 12A and the left position 12C, the brake valve section 12 forms a flow path that allows hydraulic fluid to flow between the directional control valve section 11 and the right-turning port 4a and the left-turning port 4b of the turning motor 4 without substantial limitation. In contrast, at the neutral position 12B, the brake valve section 12 forms a flow path that limits the flow rate of hydraulic fluid flowing between the directional control valve section 11 and the turning motor 4, specifically, a throttle flow path including throttles with respective small opening areas.

The neutral-mode selector valve section 13 is a valve for switching a turning neutral mode between a turning free mode and a turning braking mode. The turning neutral mode is the mode of the motion of the control valve 5 when the directional control valve section 11 is in the neutral position 11B. The turning free mode is a mode of allowing the upper turning body 32 to make a free turn when the directional control valve section 11 is at the neutral position 11B; the turning braking mode is a mode of applying a braking force to the turning motion of the upper turning body 32 when the directional control valve section 11 is at the neutral position 11B.

The neutral-mode selector valve section 13 is composed of a two-position solenoid selector valve with a solenoid 13a, having a turning free mode position 13F and a turning braking mode position 13B. The solenoid 13a allows a turning braking command signal, which is an exciting current, to be input to the solenoid 13a from the controller 10.

With no input of the turning braking command signal to the solenoid 13a, the neutral-mode selector valve section 13 is kept at the turning free mode position 13F. At the turning free mode position 13F, the neutral-mode selector valve section 13 blocks the left pilot port 12c of the brake valve section 12 from the remote-control valve 6 and connects the left pilot port 12c to an accumulator 24. This connection makes the neutral mode be the turning free mode. Specifically, the connection allows the accumulator 24 to constantly supply a braking keeping pilot pressure to the left pilot port 12c to keep the brake valve section 12 at the left position 12C. The braking keeping pilot pressure has a magnitude enough to keep the brake valve section 12 at the left position 12C against the pilot pressure supplied from the remote-control valve 6 to the left pilot port 12c, even when the pilot pressure is actually supplied to the left pilot port 12c.

By the input of the turning braking command signal to the solenoid 13a, the neutral-mode selector valve section 13 is shifted from the turning free mode position 13F to the turning braking mode position 13B. At the turning braking mode position 13B, the neutral-mode selector valve section 13 connects the left pilot port 12c to the remote-control valve 6. The connection makes the neutral mode be the turning braking mode. Specifically, the connection causes the brake valve section 12 to be opened in conjunction with the directional control valve section 11 in the same direction in response to the turning operation applied to the remote-control valve 6. More specifically, when the directional control valve section 11 is kept at the neutral position 11B, the brake valve section 12 is also kept at the neutral position 12B whereas, upon the shift of the directional control valve section 11 from the neutral position 11B to the right-turning position 11A or the left-turning position 11C, the brake valve section 12 is also shifted from the neutral position 12B to the right position 12A or the left position 12C.

When the neutral-mode selector valve section 13 is kept at the turning free mode position 13F, that is, when the turning neutral mode is the turning free mode, the input of a pilot pressure from the remote-control valve 6 to the right-turning pilot port 11a of the directional control valve section 11 through the right-turning pilot line 15 shifts the directional control valve section 11 to the right-turning position 11A. Similarly, the input of a pilot pressure from the remote-control valve 6 to the left-turning pilot port 11c of the directional control valve section 11 through the left-turning pilot line 16 shifts the directional control valve section 11 to the left-turning position 11C, whereas the brake valve section 12 is constantly kept at the left position 12C by the braking keeping pilot pressure input from the accumulator 24. This allows the hydraulic fluid discharged from the hydraulic pump 2 to be supplied to the right-turning port 4a or the left-turning port 4b of the turning motor 4 against no substantial resistance (specifically, without passing through the throttles in the neutral position 12B of the brake valve section 12), in response to the input of a pilot pressure to the right-turning pilot port 11a or the left-turning pilot port 11c, thereby enabling the upper turning body 32 to perform a right-turning motion or a left-turning motion.

In the turning free mode, when the input of the pilot pressure to the right-turning pilot port 11a or the left-turning pilot port 11c is stopped to return the directional control valve section 11 from the right-turning position 11A or the left-turning position 11C to the neutral position 11B, the brake valve section 12 is kept at the left position 12C regardless of the action of the directional control valve section 11, which causes a flow path to be formed allowing hydraulic fluid to be circulated over the directional control valve section 11 and the turning motor 4 (without passing through the throttles). This allows the upper turning body 32 to continue the right-turning motion or the left-turning motion by its own inertia.

On the other hand, when the neutral-mode selector valve section 13 is shifted to the turning braking mode position 13B, that is, when the neutral mode is the turning braking mode, the input of a pilot pressure from the remote-control valve 6 to the right-turning pilot port 11a of the directional control valve section 11 through the right-turning pilot line 15 shifts the directional control valve section 11 to the right-turning position 11A and, at the same time, the pilot pressure is also input to the right pilot port 12a of the brake valve section 12 to shift the brake valve section 12 to the right position 12A. Similarly, the input of a pilot pressure from the remote-control valve 6 to the left-turning pilot port 11e of the directional control valve section 11 through the left-turning pilot line 16 shifts the directional control valve section 11 to the left-turning position 11C and, at the same time, the pilot pressure is also input to the left pilot port 12c of the brake valve section 12 to shift the brake valve section 12 to the left position 12C. This allows, similarly to the turning free mode, the hydraulic fluid discharged from the hydraulic pump 2 to be supplied to the right-turning port 4a or the left-turning port 4b of the turning motor 4 against no substantial resistance (specifically, without passing through the throttles in the neutral position 12B of the brake valve section 12), in response to the input of a pilot pressure to the right-turning pilot port 11a or the left-turning pilot port 11c, thereby enabling the upper turning body 32 to perform a right-turning motion or a left-turning motion.

On the other hand, when the supply of a pilot pressure is stopped, in the turning braking mode, to return the directional control valve section 11 to the neutral position 11B from the right-turning position 11A or the left-turning position 11C, the brake valve section 12 is also returned to the neutral position 12B from the right position 12A or the left position 12C by the stop of the supply of the pilot pressure. The throttles included in the neutral position 12B quickly reduces the flow rate of the hydraulic fluid circulated over the turning motor 4 and the directional control valve section 11, thereby causing a braking force to be applied to the turning motor 4.

The neutral-mode selection switch 23 is provided in the cab 44 and allows an operation for selecting a neutral mode to be applied to the neutral-mode selection switch 23 by an operator. Specifically, to the neutral-mode selection switch 23 is alternatively applied a turning-free-mode selection operation for selecting the turning free mode and a turning-braking-mode selection operation for selecting the turning braking mode. The neutral-mode selection switch 23 inputs a turning-free-mode selection signal to the controller 10 in response to the application of the turning-free-mode selection operation to the neutral-mode selection switch 23, and inputs a turning-braking-mode selection signal to the controller 10 in response to the application of the turning-braking-mode selection operation to the neutral-mode selection switch 23. The controller 10 is configured to stop the input of the turning braking command signal to the neutral-mode selector valve section 13 to make the turning neutral mode of the control valve 5 be the turning free mode when the turning-free-mode selection signal is input to the controller 10, and configured to input the turning braking command signal to the neutral-mode selector valve section 13 to make the turning neutral mode be the turning braking mode only when the turning-braking-mode selection signal is input to the controller 10.

As shown in FIG. 1, the turning operation device 21 is provided in the cab 44. The turning operation device 21 includes an operation lever 21a, to which a turning operation for making the upper turning body 32 perform a turning motion with respect to the lower traveling body 31 is applied. The turning operation is an operation of rotationally moving the operation lever 21a from the neutral operation position to the right-turning operation position or the left-turning operation position.

The remote-control valve 6 is provided in the cab 44. The remote-control valve 6 is linked with the turning operation device 21 to allow the pilot pressure corresponding to the turning operation applied to the operation lever 21a to be input to the brake valve section 12 in the turning braking mode and the directional control valve section 11 from an unillustrated pilot hydraulic source. The remote-control valve 6 allows a pilot pressure for shifting the directional control valve section 11 to the right-turning position 11A, namely, a right-turning pilot pressure, to be input to the right-turning pilot port 11a through the right-turning pilot line 15 when the operation lever 21a is operated to the right-turning operation position, and allows a pilot pressure for shifting the brake valve section 12 to the right position 12A in the turning braking mode to be input to the right pilot port 12a. The remote-control valve 6 allows a pilot pressure for shifting the directional control valve section 11 to the left-turning position 11C, namely, a left-turning pilot pressure, to be input to the left-turning pilot port 11c through the left-turning pilot line 16 when the operation lever 21a is operated to the left-turning operation position, and allows a pilot pressure for shifting the brake valve section 12 to the left position 12C in the turning braking mode to be input to the left pilot port 12c.

On the other hand, upon the return of the operation lever 21a to the neutral operation position, the remote-control valve 6 stops the input of the pilot pressure to return the directional control valve section 11 to the neutral position 11B. At this time, if the neutral-mode selector valve section 13 is kept at the turning free mode position 13F, the brake valve section 12 is kept at the left position 12C regardless of the pilot pressure. This allows the upper turning body 32 to continue to be turned by inertia of the upper turning body 32 with no positive limitation on the flow rate of the hydraulic fluid circulated over the turning motor 4 and the directional control valve section 11. On the other hand, if the neutral-mode selector valve section 13 is shifted to the turning braking mode position 13B, the stop of the input of the pilot pressure involves the return of the brake valve section 12 to the neutral position 12B. This imposes a significant limitation on the flow rate of the hydraulic fluid circulated over the turning motor 4 and the directional control valve section 11 to cause a braking force to be applied to the turning motor 4.

The remote-control valve 6 makes the pilot pressure applied to the control valve 5 from an unillustrated pilot hydraulic source have a magnitude corresponding to a turning operational amount which is the magnitude of the turning operation applied to the operation lever 21a. By the input of this pilot pressure to the directional control valve section 11, the directional control valve section 11 is shifted from the neutral position 11B to the right-turning position 11A or the left-turning position 11C. The pilot pressure is also input to the brake valve section 12, thereby shifting the brake valve section 12 between the neutral position 12B and the right position 12A or the left position 12C.

Each of the right-turning pilot pressure sensor 7A and the left-turning pilot pressure sensor 7C is composed of a pressure sensor. The right-turning pilot pressure sensor 7A is connected to the right-turning pilot line 15 to detect the pilot pressure that is input to the right-turning pilot port 11a through the right-turning pilot line 15, namely, the right-turning pilot pressure. The left-turning pilot pressure sensor 7C is connected to the left-turning pilot line 16 to detect the pilot pressure that is input to the left-turning pilot port 11c through the left-turning pilot line 16, namely, the left-turning pilot pressure.

The parking brake 8 is switchable between a braking state and a braking release state. The braking state is a state of applying a braking force to the turning motor 4 to brake the turn of the upper turning body 32 with respect to the lower traveling body 31. The braking release state is a state of releasing the braking of the turn. The braking operation valve 9 is composed of a solenoid selector valve and configured to be opened and closed so as to regulate the flow rate of the hydraulic fluid supplied to the parking brake 8 in response to a command signal that is input from the controller 10, thereby enabling the parking brake 8 to be turned on and off, i.e., to be switched between the braking state and the braking release state.

As shown in FIG. 1, the brake operation device 20 is provided in the cab 44. The brake operation device 20 is, for example, a rocker switch. To the brake operation device 20 is applied an operation for turning on/off the parking brake 8, namely, a braking operation and a braking release operation, by an operator. The braking operation, namely, ON operation, is an operation for operating the braking operation valve 9 to bring the parking brake 8 into the braking state (ON state). On the other hand, the braking release operation, namely, OFF operation, is an operation for operating the braking operation valve 9 so as to bring the parking brake 8 into the braking release state (OFF state).

The brake operation device 20 is preferably provided on the operation lever 21a of the turning operation device 21. The brake operation device 20, however, may be provided at a location other than the operation lever 21a.

The controller 10 comprehensively controls the motions of the crane 1. To the controller 10 are input respective detection signals generated by the pilot pressure sensors 7A, 7C, the turning speed detector 17, and the load detector 18. The controller 10 determines the operational direction and the operational amount of the operation lever 21a based on the pilot pressure detected by the pilot pressure sensors 7A and 7C.

The braking control unit included in the controller 10 is an example of the braking controller according to the present invention. The braking control unit executes a turning motion judgment and a braking motion control. The turning motion judgment is a judgment on whether or not the upper turning body 32 is performing a turning motion with respect to the lower traveling body 31. The braking motion control is a control to switch the parking brake 8 between the braking state and the braking release state by the input of a command signal to the braking operation valve 9 according to the result of the judgment.

The braking control unit of the controller 10 executes a braking operation invalidation control when judging that the upper turning body 32 is performing the turning motion. The braking operation invalidation control is a control to invalidate the braking operation applied to the brake operation device 20, that is, the operation for bringing the parking brake 8 into the braking state. In other words, the braking operation invalidation control is a control to prohibit the parking brake 8 from being switched to the braking state by the braking operation. The braking operation invalidation control is able to prevent the parking brake 8 from being actuated during the turning motion of the upper turning body 32. This restrains the swing of the suspended load suspended from the tip of the boom 34 or the breakage of the boom 34 from being caused by the sudden stop of the turning of the upper turning body 32.

Specifically, the braking control unit of the controller 10 judges whether or not a turning judgment requirement is satisfied. The turning judgment requirement is a preset requirement for the judgment that the upper turning body 32 is performing the turning motion. The braking control unit executes the braking operation invalidation control only when judging that the turning judgment requirement is satisfied. The turning judgment requirement according to the present embodiment is a turning speed requirement that the upper turning body 32 is performing a substantial turning motion, specifically, that the turning speed v of the upper turning body 32 exceeds a turning speed threshold value vt. The turning speed v is determined based on the detection signal that is generated by the turning speed detector 17. The turning speed detector 17 is, for example, a turning angle sensor or a gyro sensor.

The turning speed threshold vt is set to such a value that the lateral load F of the boom 34 is equal to or less than an allowable load when the turning speed v is equal to or less than the turning speed threshold vt. The lateral load F is calculated on the basis of the swing of the suspended load 52 upon the stop of the turn of the upper turning body 32, and the allowable load is calculated based on the bending strength of the boom 34.

Figure 3:
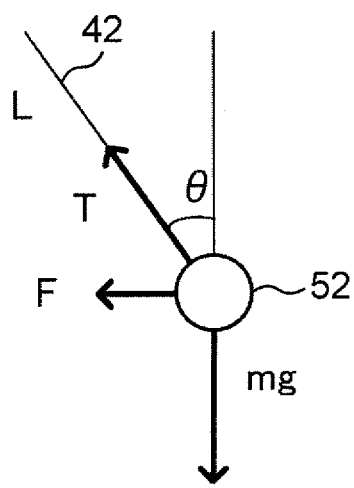
FIG. 3 is a view showing a force acting on a suspended load that is suspended by the crane.

The turning speed threshold can be set, for example, as follows. The lateral load F is given as $F=T \sin\theta$ with use of the tension T and the angle $\theta$ shown in FIG. 3. The tension T is the tension in the hoisting rope 42, acting on the suspended load 52 shown in FIG. 3, and the deflection angle $\theta$ is the maximum swing angle for confining the lateral load F less than or equal to an allowable load corresponding to the strength of the boom 34. When the suspended load 52 has a mass m, $T \cos\theta = mg$ and, therefore, $F = mg \tan\theta$, which allows the angle $\theta$ to be represented by equation (1).

$$\theta = \arctan(F/mg) \quad (1)$$

On the other hand, the energy conservation regarding the suspended load 52 is represented as $mv^2/2 = mgL(1-\cos\theta)$ with use of the lifting height L by the boom 34.

This allows the turning speed threshold vt to be represented by equation (2).

$$vt = (2gL(1-\cos\theta))^{1/2} \quad (2)$$

The above equations (1) and (2) allows the turning speed threshold vt to be calculated therefrom.

The controller 10 can suitably restrain the upper turning body 32 which is performing the turning motion from sudden stop by means of executing the braking operation invalidation control to prevent the parking brake 8 from being actuated when the turning speed v of the upper turning body 32 exceeds the turning speed threshold vt. This can suitably restrain the sudden stop of the upper turning body 32 from causing the swing of the suspended load 52 or the breakage of the boom 34.

The controller 10 validates the braking operation for turning on the parking brake 8 when the upper turning body 32 is turning at a very slow speed enough to prevent the turning speed v of the upper turning body 32 from exceeding the turning speed threshold vt. Thus allowing the braking force of the parking brake 8 to stop the turn of the upper turning body 32 enables the upper turning body 32 to be prevented from being naturally turned at a very slow speed by a wind or the inclination of the ground, even when the control valve 5 is in the turning free mode.

The turning speed threshold vt is set in accordance with the load by the suspended load 52. This load is the gravitational load acting on the suspended load 52 that is suspended from the boom 34, detected by the load detector 18. The load detector 18 is composed of, for example, a load cell, which detects the tension T in the hoisting rope 42. More specifically, the load detector 18 detects the load acting on a sheave on which the hoisting rope 42 is placed, thereby enabling the load by the load 52 to be determined.

Figure 4:
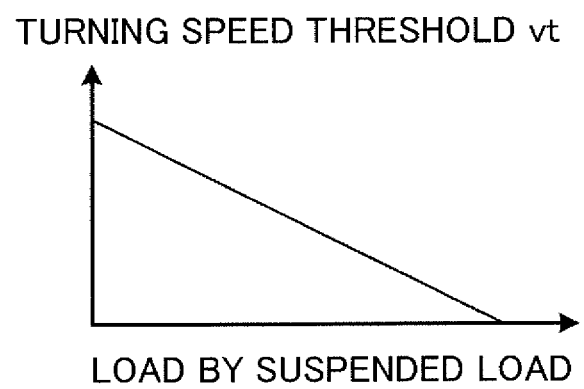
FIG. 4 is a graphical view of the relationship between the load by the suspended load and a turning speed threshold.

FIG. 4 is a graph showing an example of the relationship between a load (the unit thereof is, for example, ton) by the load 52 and the turning speed threshold vt (the unit thereof is, for example, rpm). According to the example shown in FIG. 4, the greater the load by the suspended load 52, i.e., the heavier the suspended load 52, the lower the value to be set as the turning speed threshold vt. This enables a suitable turning speed threshold vt for restraining the swing of the suspended load 52 or the breakage of the boom 34 to be properly set in accordance with the weight of the suspended load 52.

The turning judgment requirement, alternatively, in the turning braking mode, may be a turning operation requirement. The turning operation requirement is that the turning operation is applied to the turning operation device 21. In the turning braking mode, where the turning of the upper turning body 32 is braked with no application of the turning operation to the turning operation device 21, that is, with the operation lever 21a at the neutral operation position, the state of no application of the turning operation to the turning operation device 21 can be regarded as a state where the upper turning body 32 is performing no turning motion. In other words, it can be set as the turning judgment requirement that the turning operation is applied to the turning operation device 21.

The turning judgment requirement may include both the turning speed requirement and the turning operation requirement. Specifically, the braking control unit may be configured to execute the braking operation invalidation control only when both the turning speed requirement and the turning operation requirement are satisfied. The turning judgment requirement, alternatively, may be that at least one of the turning speed requirement and the turning operation requirement is satisfied.

In the case of the judgment that the satisfaction of the turning speed requirement has been lost, that is, the turning speed v has become equal to or less than the turning speed threshold value vt, during the execution of the braking operation invalidation control, the braking control unit of the controller 10 is configured not to immediately release the braking operation invalidation control but to continue the braking operation invalidation control until the braking release operation for turning off the parking brake 8 is applied to the brake operation device 20. In other words, even if the substantial turning motion of the upper turning body 32 has been stopped to cause the turning speed requirement to fail to be satisfied during the execution of the braking operation invalidation control, the braking control unit of the controller 10 suspends immediate validation of the braking operation. In this case, the braking control unit of the controller 10 releases the braking operation invalidation control only when the braking release operation for turning off the parking brake 8 is applied to the brake operation device 20. Thus, the parking brake 8 is allowed to be activated, that is, allowed to be shifted to the braking state, only by the re-application of the braking release operation for turning on the parking brake 8 to the brake operation device 20 after the release of the braking release operation. This allows the operator's intention to be more accurately reflected in the actuation of the parking brake 8, restraining the parking brake 8 more reliably from being actuated on the contrary to the operator's intention.

The braking control unit of the controller 10 is configured to execute a release operation invalidation control when the turning operation is applied to the turning operation device 21 while the parking brake 8 is turned on, that is, in the braking state. The release operation invalidation control is a control to invalidate the braking release operation applied to the brake operation device 20, that is, the operation for rendering the parking brake 8 off (in the braking release state). The braking release invalidation control can prevent the upper turning body 32 from being suddenly turned immediately after the release of the braking by the parking brake 8 during the application of the turning operation, thereby suitably restraining the swing of the suspended load or the breakage of the boom 34 from being caused by the sudden turn.

The crane 1 further includes an information device 22. The information device 22 is provided in the cab 44. The information device 22 is capable of informing the outside of the execution of the braking operation invalidation control by the braking control unit. The information device 22 is, for example, a pilot lamp that is lighted up when the parking brake control is being executed. The information can render an operator aware of the inoperability of the parking brake 8.

Figure 5:
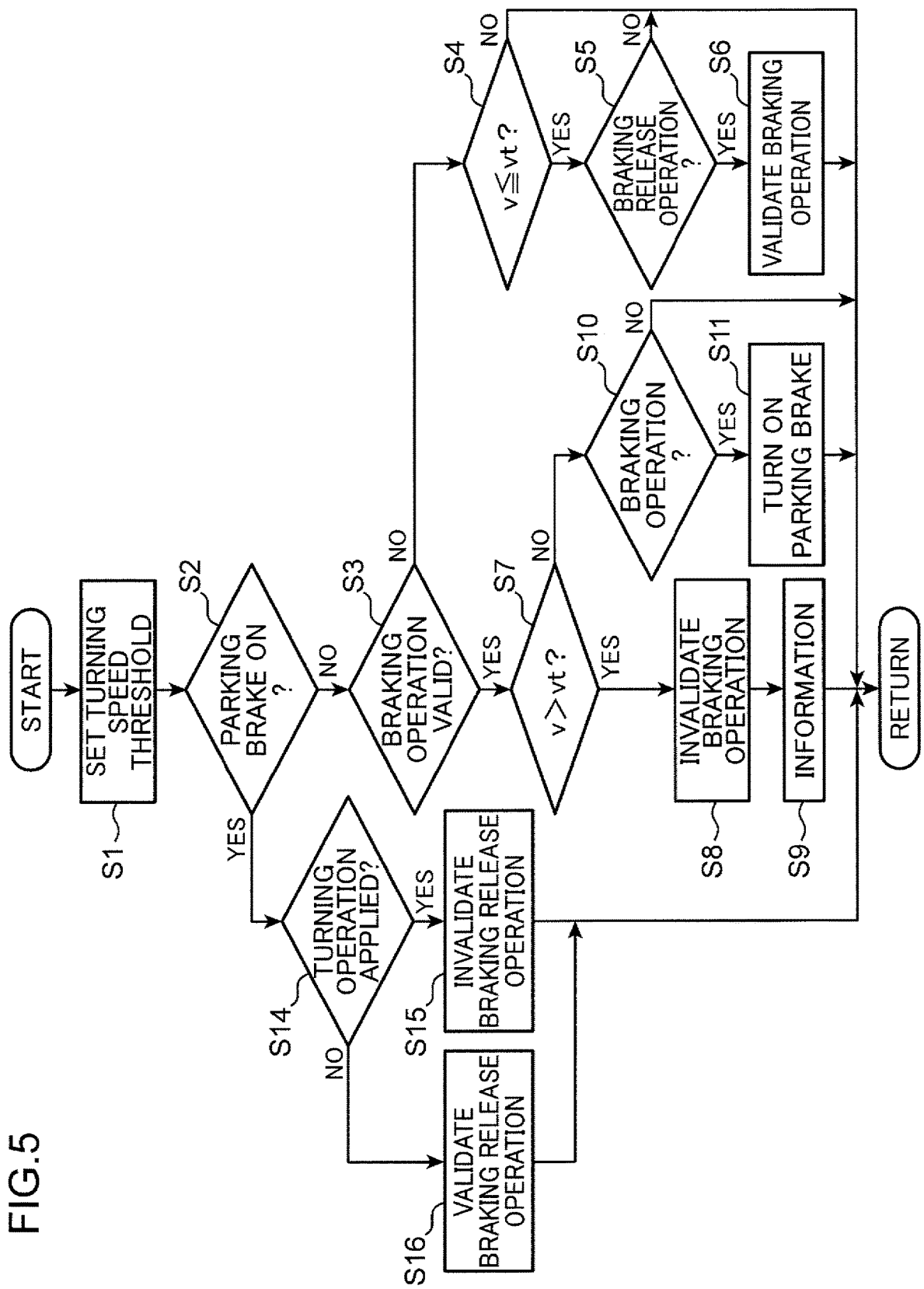
FIG. 5 is a flowchart showing arithmetic control operations performed by a controller included in the parking brake apparatus of the crane.

Next will be explained the arithmetic control operation performed by the controller 10 with use of the flowchart shown in FIG. 5.

First, the braking control unit of the controller 10 sets the turning speed threshold vt that is the threshold value of the turning speed v of the upper turning body 32 (step S1). The turning speed threshold vt is set in accordance with the load by the suspended load 52 detected by the load detector 18. For example, as shown in FIG. 4, the turning speed threshold vt is set to be lowed value with an increase in the weight of the suspended load 52, whereby the significant swing of the suspended load 52 or damage in the boom 34 is suitably reduced.

Next, the controller 10 judges whether or not the parking brake 8 is turned on, that is, whether or not the parking brake 8 is in the braking state (step S2). When judging that the parking brake 8 is not in the braking state, i.e., is in the braking release state (NO in step S2), the controller 10 judges whether or not the operation for turning on the parking brake 8, namely, the braking operation, is validated, that is, whether the braking operation invalidation control is not executed (step S3).

When judging that the braking operation is valid, that is, judging that the braking operation invalidation control is not executed (YES in step S3), the braking control unit of the controller 10 judges whether or not the turning speed v of the upper turning body 32 exceeds the turning speed threshold value vt, that is, whether or not the turning speed requirement is satisfied (step S7).

When judging that the turning speed v of the upper turning body 32 exceeds the turning speed threshold value vt (YES in step S7), the controller 10 invalidates the braking operation applied to the brake operation device 20, that is, the operation for turning on the parking brake 8 (bringing it into the braking state) (step S8). In short, the braking operation invalidation control is executed. In accordance therewith, the controller 10 makes the information device 22 perform an information action, for example, light up a pilot lamp, thereby making the outside informed of the invalidation of the braking operation for turning on the parking brake 8 (step S9).

Thus invalidating the braking operation applied to the brake operation device 20, that is, the operation for turning on the parking brake 8 (Step S8) when the upper turning body 32 is performing a substantial turning motion with respect to the lower traveling body 31 (YES in Step S7) prevents the parking brake 8 from being brought into the braking state during the substantial turning motion of the upper turning body 32, thereby restraining the sudden stop of the upper turning body 32 from causing significant swing of the suspended load 52 or damage in the boom 34.

Specifically, the braking control unit of the controller 10 prevents the parking brake 8 from being brought into the braking state when the turning speed v of the upper turning body 32 exceeds the turning speed threshold value vt to suitably restrain the upper turning body 32 from sudden stop, thereby suitably restraining the sudden stop of the upper turning body 32 from causing the swing of the suspended load 52 or the breakage of the boom 34.

Besides, even when the upper turning body 32 is performing a natural turning motion of being naturally turned by a wind or the inclination of the ground while the directional control valve section 11 is at the neutral position 11B in the turning free mode, executing the braking operation invalidation control only when the turning speed v of the natural turning operation exceeds the turning speed threshold vt enables the motion of the parking brake 8 to be properly restrained.

Besides, the braking control unit of the controller 10, which informs the outside of the invalidation of the braking operation for turning on the parking brake 8 through the information device 22 (Step S9), can render an operator aware of the inoperability of the parking brake 8 during the turning motion of the upper turning body 32.

When judging, in step S7, that the turning speed v does not exceed the turning speed threshold vt (NO in step S7), the braking control unit of the controller 10 judges whether or not the braking operation for turning on the parking brake 8 (for bringing it into the braking state) is applied to the brake operation device 20 (step S10).

When judging that the braking operation is applied (YES in step S10), the controller 10 inputs a command signal to the braking operation valve 9 to bring the parking brake 8 into the braking state (Step S11). On the other hand, when judging that the braking operation is not applied (NO in step S10), the controller 10 keeps the parking brake 8 in the braking release state.

The requirement to be judged in step S7, namely, the turning judgment requirement, may be the turning operation requirement that the turning operation is applied to the turning operation device 21. On the other hand, when being the turning speed requirement that the actual turning speed v exceeds the turning speed threshold vt, the requirement according to step S7 enables more suitable brake invalidation control to be executed. For example, when the turning motion of the upper turning body 32 is stopped, during the natural turning motion in which the upper turning body 32 is naturally turned by a wind or the inclination of the ground in the turning free mode, by the application of the turning operation for making the upper turning body 32 perform the turning motion with respect to the upper turning body 32 in the direction opposite to the direction of the natural turning motion, there occurs a state where the turning motion of the upper turning body 32 is stopped in spite of the application of the turning operation to the turning operation device 21. In such a case, suspending the braking operation invalidation control regardless of the absence of the turning operation, that is, validating the braking operation for turning on the parking brake 8, enables the natural turning motion of the upper turning body 32 to be prevented by the braking force of the parking brake 8.

Besides, even when the upper turning body 32 is naturally turned at a very slow speed by a wind or the inclination of the ground with the directional control valve section 11 in the neutral position 11B in the turning free mode, that is, even when the upper turning body 32 is performing the natural turning motion, the braking control unit keeps the braking operation for turning on the parking brake 8, that is, bringing it into the braking state, valid, unless the turning speed v of the natural turning operation exceeds the turning speed threshold vt. This enables the natural turning motion of the upper turning body 32 to be stopped by the braking force of the parking brake 8.

When judging in step S3 that the braking operation for turning on the parking brake 8 is not valid (NO in Step S3), that is, when the braking operation invalidation control is being executed, the braking control unit of the controller 10 judges whether or not the turning motion has been stopped, specifically, whether or not the turning speed v has been equal to or less than the turning speed threshold value vt (step S4).

When judging in step S4 that the turning motion is not stopped (NO in step S4), the braking control unit of the controller 10 continues the braking operation invalidation control. Even when judging in step S4 that the turning operation has been stopped (YES in step S4), the braking control unit of the controller 10 continues the braking operation invalidation control unless the braking release operation for turning off the parking brake 8 is applied to the brake operation device 20 (NO in step S5). In other words, only when the braking release operation for turning off the parking brake 8 is applied to the brake operation device 20 (YES in step S5), the braking control unit of the controller 10 releases the braking operation invalidation control to thereby validate the braking operation (step S6).

Thus, even if the turning motion of the upper turning body 32 is stopped to make the turning judgment requirement for invalidating the braking operation fail to be satisfied when the braking operation for turning on the parking brake 8 is invalidated, the braking control unit does not immediately validate the previously invalidated braking operation at this time. In short, the braking control unit does not immediately release the braking operation invalidation control at that point in time. The braking control unit validates the braking operation only when the braking operation for turning off the parking brake 8 is applied to the brake operation device 20 (step S6), and thereafter activates the parking brake 8 to bring it into the braking state (Step S11) only when the brake operation is applied to the brake operation device 20 (YES in step S10). This allows the operator's intention to be properly reflected in the actuation of the parking brake 8, preventing the parking brake 8 from being actuated on contrary to the operator's intention.

On the other hand, when judging in step S2 that the parking brake 8 is turned on, i.e., in the braking state (YES in step S2), the braking control unit of the controller 10 judges whether or not the turning operation is applied to the turning operation device 21 (step S14).

When judging that the turning operation is applied (YES in step S14), the braking control unit of the controller 10 invalidates the braking release operation applied to the brake operation device 20 for turning off the parking brake 8 (step S15). In short, the braking control unit executes the release operation invalidation control.

The braking control unit, thus, executes the release operation invalidation control to invalidate the braking release operation applied to the brake operation device 20 when the turning operation is applied to the turning operation device 21 with the parking brake 8 in the braking state. This control can prevent the upper turning body 32 from being suddenly turned by the release of the braking by the parking brake 8 while the turning operation is applied, thereby suitably restraining significant swing of the suspended load or breakage of the boom 34 from being caused by the sudden turn. The release operation invalidation control is continued until the turning operation is released, that is, until the operation lever 21a is returned to the neutral operation position. In other words, only when the turning operation is released (NO in step S14), the braking control unit releases the release operation invalidation control to thereby validate the braking release operation (Step S16).

The above arithmetic control operation is carried out in both the turning free mode and the turning braking mode. The work machine to which the parking brake apparatus according to the present invention is applied, however, is not limited to one having both the turning free mode and the turning braking mode. For example, the parking brake apparatus according to the present invention is applicable to either a work machine that always allows the upper turning body 32 to make free turning with the directional control valve section 11 at the neutral position 11B or, conversely, a work machine that always brakes the turning of the upper turning body 32 with the directional control valve section 11 at the neutral position 11B. For the latter work machine, the turning operation requirement that the turning operation is applied to the turning operation device 21 is adoptable as the turning judgment requirement, similarly to the crane 1 according to the embodiment. This eliminates the need for a special turning speed detector for the control of the parking brake 8 to thereby contribute to the simplification of the work machine.

Thus is provided a parking brake apparatus installable on a work machine that includes a lower travel body, an upper turning body mounted on an upper part of the lower travel body capably of turning, and an attachment mounted on the upper turning body. The parking brake apparatus includes a parking brake, a brake operation device, and a braking controller. The parking brake is switchable between a braking state of braking turning of the upper turning body with respect to the lower traveling body and a braking release state of releasing braking of the turning. The brake operation device allows a braking operation and a braking release operation to be applied to the brake operation device. The braking operation is an operation for bringing the parking brake into the braking state, and the braking release operation is an operation for bringing the parking brake into the braking release state. The braking controller is configured to judge whether or not a preset turning judgment requirement for judgment that the upper turning body is performing a turning motion with respect to the lower traveling body is satisfied and configured to execute a braking operation invalidation control only when judging that the turning judgment requirement is satisfied. The braking operation invalidation control is a control to invalidate the braking operation applied to the brake operation device, that is, a control to prohibit the parking brake from being brought into the braking state by the braking operation applied to the brake operation device.

The braking operation invalidation control can prevent the parking brake from being actuated, that is, switched to the braking state, during the turning motion of the upper turning body to thereby restrain swing of the suspended load or breakage of the attachment (e.g., a boom) from being caused by the sudden stop of the upper turning body.

Specifically, it is preferable that the parking brake apparatus further includes a turning speed detector that detects a turning speed of the upper turning body and the turning judgment requirement includes a turning speed requirement. The turning speed requirement is that the turning speed of the upper turning body exceeds a turning speed threshold. The judgment on the turning operation based on the turning speed requirement enables the upper turning body to be restrained more accurately from the sudden stop based on the actually detected turning state of the upper turning body to thereby suitably restrain significant swing of the suspended load or breakage of the attachment from being caused by the sudden stop. Besides, even when the upper turning body is made perform a natural turning motion by a wind or the inclination of the ground with no turning operation, the propriety of the braking operation invalidation control can be properly judged based on the speed of the natural turning operation.

More specifically, it is preferable that the parking brake apparatus further includes a load detector that detects a load by a suspended load that is suspended from the attachment, wherein the braking controller is configured to set the turning speed threshold in accordance with the load detected by the load detector, e.g., to set the turning speed threshold to a value decreased with an increase in the load. This allows the judgment on whether or not the braking operation invalidation control based on the turning speed should be executed to be made more appropriately.

Alternatively, in the case where the work machine further includes a turning operation device which allows a turning operation to be applied to the turning operation device by an operator, the turning operation being an operation for making the upper turning body perform the turning motion, and the work machine is configured so that the turning motion of the upper turning body is braked in a neutral operation state where the turning operation is not applied to the turning operation device, the turning judgment requirement may include a turning operation requirement. The turning operation requirement is that the turning operation is applied to the turning operation device. The turning operation requirement enables the judgment on the presence or absence of the turning operation to be made without detecting the actual turning speed.

Preferably, the braking controller is configured to continue the braking operation invalidation control until the braking release operation is applied to the brake operation device when judging that the turning judgment requirement is not satisfied while the braking operation invalidation control is being executed. In other words, the braking controller is preferably configured to release the braking operation invalidation control only when the braking release operation is applied to the brake operation device, even if the turning motion of the upper turning body is stopped to cause the turning judgment requirement to fail to be satisfied while the braking operation is invalidated, without immediately validating the previously invalidated braking operation. In this case, the parking brake is switched to the braking state only when the braking operation is applied to the brake operation device after the application of the braking release operation to the brake operation device. This allows the operator's intention to be more properly reflected in the actuation of the parking brake, preventing the parking brake from being actuated on contrary to the operator's intention.

Preferably, the braking controller performs a release operation invalidation control when the turning operation is applied to the turning operation device with the parking brake in the braking state. The release operation invalidation control is a control to invalidate the braking release operation applied to the brake operation device, preventing the upper turning body from being suddenly turned by the shift of the parking brake from the braking state to the braking release state while the turning operation is applied to thereby suitably restrain significant swing of the suspended load or breakage of the attachment from being caused by the sudden turn.

It is preferable that the parking brake apparatus further includes an information device capable of performing information of execution of the braking operation invalidation control, and the braking controller is configured to make the information device perform the information when the braking operation invalidation control is being executed. The information can render an operator aware of the inoperability of the parking brake during the turning motion of the upper turning body.

Also provided is a work machine including: a lower traveling body; an upper turning body mounted on the lower traveling body capably of turning; an attachment attached to the upper turning body; and the above-described parking brake apparatus.

The above description about the embodiments according to the present invention shows just specific examples, not intending to limit the invention but permitting specific configurations and the like to be appropriately modified. Also, the effects and advantages described in the embodiments of the invention have just enumerated the most preferred effects and effects arising from the present invention, and the effects and advantages of the present invention are not limited to those described in embodiments of the invention.

The invention claimed is:
1. A work machine comprising:
a lower traveling body;
an upper turning body mounted on the lower traveling body capably of turning;
an attachment attached to the upper turning body; and
a parking brake apparatus that includes:
  a parking brake switchable between a braking state of braking turning of the upper turning body with respect to the lower traveling body and a braking release state of releasing braking of the turning;
  a brake operation device that allows a braking operation and a braking release operation to be applied to the brake operation device, the braking operation being an operation for bringing the parking brake into the braking state, the braking release operation being an operation for bringing the parking brake into the braking release state;
  a braking controller configured to judge whether or not a preset turning judgment requirement for judgment that the upper turning body is performing a turning motion with respect to the lower traveling body is satisfied and configured to execute a braking operation invalidation control only when judging that the turning judgment requirement is satisfied, the brak- ing operation invalidation control being a control to invalidate the braking operation applied to the brake operation device;

a turning speed detector that detects a turning speed of the upper turning body, wherein the turning judgment requirement is a turning speed requirement that the turning speed detected by the turning speed detector exceeds a turning speed threshold; and a load detector that detects a load by a suspended load that is suspended from the attachment, wherein the braking controller is configured to set the turning speed threshold in accordance with the load detected by the load detector, and wherein the braking controller is configured to execute the braking operation invalidation control only when judging that the turning speed detected by the turning speed detector exceeds the turning speed threshold that is set in accordance with the load detected by the load detector.

2. The work machine according to claim 1, further comprising a turning operation device, which allows a turning operation to be applied to the turning operation device by an operator, the turning operation being an operation for making the upper turning body perform the turning motion, wherein the braking controller is configured to execute a release operation invalidation control when the turning operation is applied to the turning operation device while the parking brake is in the braking state, the release operation invalidation control being a control to invalidate the braking release operation applied to the brake operation device.

3. The work machine according to claim 1, wherein the braking controller is configured to continue the braking operation invalidation control until the braking release operation is applied to the brake operation device when judging that the turning judgment requirement is not satisfied while the braking operation invalidation control is being executed.

4. The work machine according to claim 1, further comprising an information device capable of performing information of execution of the braking operation invalidation control, wherein the braking controller is configured to make the information device perform the information when the braking operation invalidation control is being executed.

5. The work machine according to claim 1, further comprising a turning operation device which allows a turning operation to be applied to the turning operation device by an operator, the turning operation being an operation for making the upper turning body perform the turning motion, wherein the turning judgment requirement includes a turning operation requirement that the turning operation is applied to the turning operation device.

* * * * *